(12) United States Patent
Dyer (10) Patent No.: US 9,980,473 B2
(45) Date of Patent: May 29, 2018

(54) LINE LIGHT

(71) Applicant: William Dyer, Spokane, WA (US)

(72) Inventor: William Dyer, Spokane, WA (US)

(73) Assignee: William Dyer, Spokane, WA (US)

( * ) Notice: Subject to any disclaimer, the term of this patent is extended or adjusted under 35 U.S.C. 154(b) by 0 days. days.

(21) Appl. No.: 15/437,278

(22) Filed: Feb. 20, 2017

(65) Prior Publication Data

US 2017/0208790 A1    Jul. 27, 2017

Related U.S. Application Data (63) Continuation of application No. 14/295,602, filed on Jun. 4, 2014, now abandoned.

(51) Int. Cl.
| | |
|---|---|
| *A01K 91/06* | (2006.01) |
| *A01K 97/02* | (2006.01) |
| *A01K 95/00* | (2006.01) |
| *F21V 31/00* | (2006.01) |
| *F21L 4/00* | (2006.01) |
| *F21V 33/00* | (2006.01) |
| *F21Y 115/10* | (2016.01) |

(52) U.S. Cl.
CPC .............. *A01K 97/02* (2013.01); *A01K 91/06* (2013.01); *A01K 95/00* (2013.01); *F21L 4/00* (2013.01); *F21V 31/005* (2013.01); *F21V 33/008* (2013.01); *F21Y 2115/10* (2016.08)

(58) Field of Classification Search
CPC ........ A01K 93/00; A01K 93/02; A01K 97/12; A01K 87/00
See application file for complete search history.

(56) References Cited

U.S. PATENT DOCUMENTS

| | | | |
|---|---|---|---|
| 3,486,266 A | 7/1968 | Richardson et al. | |
| 3,798,822 A * | 3/1974 | Lampus | A01K 75/02 43/17.5 |
| 4,085,538 A | 4/1978 | Jankowski | |
| 4,157,627 A * | 6/1979 | Tschelisnik | A01K 93/02 362/109 |
| 5,157,857 A | 10/1992 | Livingston | |
| 5,495,690 A * | 3/1996 | Hunt | A01K 85/01 43/17.6 |
| 7,707,764 B1 | 5/2010 | Osborn | |
| 2004/0111950 A1 * | 6/2004 | Lindgren | A01K 85/01 43/17.5 |
| 2006/0096152 A1 | 5/2006 | Pelegrin | |
| 2008/0196291 A1 * | 8/2008 | Gelber | A01K 85/01 43/17.6 |
| 2009/0223109 A1 | 9/2009 | Makowski | |

FOREIGN PATENT DOCUMENTS

WO    PCT/AU95/00846    3/1997

* cited by examiner

*Primary Examiner* — Thanh Pham
(74) *Attorney, Agent, or Firm* — Randall Danskin P.S.

(57) ABSTRACT

A line light provides a disc shaped battery carrying, in electrical connectivity, two parallel electrically conductive tubes, one tube on each battery pole. A line tube is carried adjacent and parallel to one electrically conductive tube. A waterproof coating extends entirely thereabout. An LED releasably simultaneously interconnects with the two electrically conductive tubes to complete a circuit providing electrical power for illumination of the LED.

14 Claims, 5 Drawing Sheets

LINE LIGHT

RELATED APPLICATIONS

This Utility Patent Application is a Continuation in Part of U.S. Utility patent application Ser. No. 14/295,602 filed on Jun. 4, 2014 and which claims priority to earlier filed U.S. Provisional Patent Application No. 61/835,156 filed on Jun. 14, 2013 both by the same inventor William Dyer. The entire contents of the identified earlier filed U.S. Ser. No. 14/295,602 and earlier filed U.S. 61/835,156 are both entirely incorporated herein by this reference. This claim of priority is similarly made in the Application Data Sheet (ADS) that is filed herewith.

FIELD OF INVENTION

This invention relates to fishing activities, and more particularly to an electrically powered illumination device carried on a fishing line proximate a fishing lure for illuminating fishing lure during use to increase perceptibility by fish.

BACKGROUND AND DESCRIPTION OF PRIOR ART

When fishing it is desirable to either fish where fish are naturally congregating in numbers, or to attract fish to the location where the fisherperson is fishing. To this end, various apparatus have been developed to attract fish using visual means, auditory means and olfactory means. Such apparatus may contain a variety of elements including, but not limited to, chemicals, rattles, and reflectors of ambient light all with the object of drawing fish closer to a lure and/or bait which the fish will hopefully bite or otherwise strike. With respect to visual attractants, at times when there is little ambient light such as at dusk, or at dawn, or on overcast days, or when fishing at great depths, ambient light fails to penetrate deeply into the water diminishing the reflection of light and making the lure less visible to fish.

There are known lighted fishing lures which combine an electrically powered light source with a fishing lure carrying at least one hook. Such know lighted fishing lures are designed and intended to be directly bitten/struck by the fish being sought. The electrically powered light source is physically embedded within the body of the fishing lure because of light source size and also so as to position the light source immediately adjacent the hook(s). Various drawbacks arise from this design. A first drawback to such known lighted fishing lures is the complexity of the electrical circuitry that allows the lighted fishing lure to operate including mechanical switches, resistors, diodes and capacitors which are all subject to failure and short-circuiting if directly exposed to a conductive fluid such as water. A further drawback is the requirement that such electrical circuitry components be carried within (inside of) the lighted fishing lure body which requires that the fishing lure body be hollow or otherwise define voids, spaces and/or aft pockets in which the electrical components are carried. These spaces/voids contain air which causes the lure to have some level of positive buoyancy which causes the lure body to tend to float. A still further drawback is physics based, notably that hydrostatic pressure increases with water depth at approximately 14.5 pounds per square inch (psi) for each 33 feet (10 meters) of water depth. Therefore, for every 33 feet (10 meters) below the water surface the lighted fishing lure is fished, the lighted fishing lure is subjected to an additional 14.5 psi of hydrostatic pressure. Such pressures crush lures that have any voids, spaces or air pockets therein. Seams or joints, such as an opening to install a battery or other power source, are particularly susceptible to leaks which cause short circuits and render the lighted fishing lure inoperative an unusable for its intended purpose. Lighted fishing lures that have switches, capacitors, resistors, diodes, wires or other complex circuitry require such voids, spaces and internal passageways which makes such known lighted fishing lures particularly susceptible to water leaks and resulting short circuits.

The *McGraw Hill Dictionary of Scientific and Technical Terms* (5$^{th}$ Ed.) (1994) defines a "Switching Device" as: "An electrical or mechanical device or mechanism, which can bring another device or circuit into an operating or non-operating state. Also known as a switching mechanism. The *New IEEE Standard Dictionary of Electrical and Electronics Terms* (5$^{th}$ Ed.) (1993) defines "Switch" as; "(NESC) (transmission and distribution). A device for opening or closing or for changing the connection of a circuit. In these rules, a switch is understood to be manually operable unless otherwise stated."

A still further known drawback to known lighted fishing lures is that each lighted fishing lure has a single unchangeable configuration. For example, a lighted "Repala®-type" fishing lure cannot be converted into a lighted "flasher-type" fishing lure, and a "large" lighted fishing lure cannot be converted into a "small" lighted fishing lure. As a result, known lighted fishing lures have limited uses because they provide little or no variability to a user.

What is needed is an apparatus that allows for the illumination of a variety of fishing lures and baits during use underwater in low light conditions that does not have the drawbacks of known apparatus. My invention provides such an apparatus by providing a waterproof light that attaches to the fishing line spacedly forward of the lure and/or bait. My line light is light-weight, durable, is not susceptible to damage by hydrostatic pressure, does not have complex circuitry or any switches, does not negatively affect "action" of the lure, does not have any spaces, voids or air pockets that might leak under hydrostatic pressure, is simple to use, can be kept in a tackle box and attached to fishing line at any time. My line light will illuminate fishing lures and baits underwater and generate reflectance off reflectors attracting more fish and thus, providing for a better yield of caught fish.

A reflection is an interpretation of light waves having a particular wavelength. While it is an organism's eye that receives light waves, it is the organism's brain that interprets those light waves and "sees".

A transparent lens called the cornea is at the front of the eye to allow light waves into the eye. Behind the cornea is the iris, which gives the eye its color. By changing size, the iris regulates the amount of light entering the pupil, which is the orifice defined by the iris. Located behind the iris is a crystalline lens which focuses the light rays entering the eye onto the retina. The retina is the inner most layer of the eye and is covered with photo receptor cells. Light waves enter the eye through the cornea, pass through the pupil are focused by the lens and strike photo receptors on the retina.

There are two types of photo receptors, rods and cones, which are named for theft relative shapes. Rod type photo receptors perceive the intensity of light and enable an organism to see in low light conditions and in darkness. Cone type photo receptors perceive the wavelengths of various light waves and enable the organism to distinguish colors.

Humans are among the minority of mammals that have color vision. In the human eye, rods are found at the peripheral regions of the retina but are nearly absent from the center of the visual field, known as the fovea, where the cones are concentrated. The human eye has about 150,000 cones (color receptors) per square millimeter of fovea area. Humans' eyes have three variants of photo-receptive cones (known as red cones, blue cones and green cones) and for that reason humans are classified as trichromic organisms. Each variant of photo receptive cone carries a unique protein, called an opsin, that reacts when struck by light waves having wavelengths that correspond to the opsin's light sensitivity. It is unknown whether the reaction is physical, chemical or both. The reaction of the opsin is communicated to the brain allowing the organism to distinguish between red, blue and green colors. Thus, the world visually perceived by humans is dominated by light having wave lengths ranging from 400-750 nanometers, or blue to red respectively.

In contrast to humans, fish have tetra-chromic vision. The eyes of tetra-chromic organisms have four variants of photo receptive cones. In addition to having three variants of cones with opsins sensitive to red, green and blue light, fish have a fourth variant of cone with an opsin that is sensitive to UV light which presumptively enables the organism to perceive ultra violet light that is invisible to humans. The peak sensitivity of the opsin on this fourth variant of photo receptive cone is at about 358 nanometers which is known as Ultra Violet A (UVA) light.

As noted above, while a human eye has about 150,000 cones per square millimeter of fovea area, the eyes of fish have more than one million cones per square millimeter of fovea area. This large difference in the number of cone type photo receptors in the fovea presumptively provides bony fish and crustaceans with greater visual acuity than humans, as well as an ability to perceive UV light that is invisible to humans.

Ultra violet light penetrates more deeply into water than visible light and ultraviolet light is abundant in near surface marine ecosystems. It is estimated there is sufficient UV light for UV vision down to a depth of approximately 200 meters in clear ocean water, while visible light penetrates clear ocean water to a depth of only approximately 20-40 meters. The current prevailing hypothesis is that UV vision is primarily used by fish to improve detection of prey.

My line light apparatus overcomes various of the aforementioned drawbacks to known fish attractants by providing a simple illumination device that incorporates a battery carrying two parallel electrically conductive tubes to releasably carry an LED, and a line tube to attach the apparatus for a fishing line. The battery and tubes are covered in a durable water-proof coating to prevent short circuits. The battery powers the LED producing light that illuminates the lure and causes reflection there-off making the fishing lure more visible even at depths. The LED may have a variety of colors including, but not limited to red, yellow, green and ultraviolet. Each tube is welded to and in electrical connectivity with one pole of the battery and the line tube is fastened to one pole of the battery adjacent to and parallel with one of the tubes. The LED light has two electrical contacts and one electrical contact is releasably carried in a medial channel defined by each tube thus completing an electrical circuit and providing the necessary electrical energy to illuminate the LED light. The line light is carried on a fishing line by threading the fishing line through a medial channel defined by the line tube. The mass of my line light is less than approximately three (3) grams, and its position spacedly forward of the lure does not negatively affect "action" of the lure/bait by causing water turbulence or other water disturbances. Further, my line light has no voids or air pockets within its structure making my line light not susceptible to water leakage due to water pressure at depths that might cause short circuits or corrosion.

Some or all of the drawbacks and problems explained above, and other drawbacks and problems, may be helped or solved by my invention shown and described herein. My invention may also be used to address other problems not set out herein or which become apparent at a later time. The future may also bring to light unknown benefits which may, in the future, be appreciated from the novel invention shown and described herein.

My invention does not reside in any one of the identified features individually, but rather in the synergistic combination of all of its structures, which give rise to the functions necessarily flowing therefrom as hereinafter specified and claimed.

SUMMARY

A line light provides a disc shaped battery carrying, in electrical connectivity, two parallel electrically conductive tubes, one tube on each battery pole. A line tube is carried adjacent and parallel to one electrically conductive tube. A waterproof coating extends entirely thereabout. An LED releasably simultaneously interconnects with the two electrically conductive tubes to complete a circuit providing electrical power for illumination of the LED.

In providing such an apparatus it is:

a principal object to provide a means for illuminating fishing lures during use underwater.

a further object to provide such an illuminating apparatus that increases reflectance off lures and reflectors during use underwater.

a further object to provide such an illuminating apparatus that may have different colors.

a further object to provide such an illuminating apparatus that generates human visible light.

a further object to provide such an illuminating apparatus that generates non human visible light.

a further object to provide such an illuminating apparatus that does not negatively affect action of a lure.

a further object to provide such an illuminating apparatus that weighs less than three grams.

a further object to provide such an illuminating apparatus that will not fill with water or collapse under pressure causing short circuits.

a further object to provide such an illuminating apparatus that is not susceptible to damage caused by water pressure during use at depths.

a further object to provide such an illuminating apparatus that uses a watch battery.

a further object to provide such an illuminating apparatus for producing greater yields of fish.

a further object to provide such an illuminating apparatus that can be inexpensively and easily manufactured using commonly available materials.

Other and further objects of my invention will appear from the following specification and accompanying drawings which form a part hereof, in carrying out the objects of my invention it is to be understood that its structures and features and steps are susceptible to change in design and arrangement and order with only one preferred and practical embodiment of the best known mode being illustrated in the accompanying drawings and specified as is required.

BRIEF DESCRIPTIONS OF DRAWINGS

Specific forms, configurations, embodiments and/or diagrams relating to and helping to describe preferred versions of my invention are explained and characterized herein, often with reference to the accompanying drawings. The drawings and all features shown therein also serve as part of the disclosure of my invention, whether described in text or merely by graphical disclosure alone. Such drawings are briefly described below.

DESCRIPTION OF PREFERRED EMBODIMENT

The readers of this document should understand that the embodiments described herein may rely on terminology used in any section of this document and other terms readily apparent from the drawings and the language common therefore as may be known in a particular art and known or indicated or provided by dictionaries. Dictionaries were used in the preparation of this document. Widely known and used in the preparation hereof are *Webster's Third New International Dictionary*, (©1993), *The New Century Dictionary* (©2001-2005) and the *American Heritage Dictionary of the English Language* (4$^{th}$ Edition ©2000) all of which are hereby incorporated by this reference for interpretation of terms used herein to more adequately or aptly describe various features, aspects and concepts shown or otherwise described herein.

This document is premised upon using one or more terms or features shown in one embodiment that may also apply to or be combined with other embodiments for similar structures, functions, features and aspects of the invention. Wording used in the claims is also descriptive of the invention and the text of both claims and abstract are incorporated by this reference into the description entirely. Terminology used with one, some or all embodiments may be used for describing and defining the technology and exclusive rights associated herewith.

My line light generally provides a body 9 having a battery 10, a first tube 15, a second tube 19, a line tube 23 and an LED 27. The battery 10 is preferably a circular disc shaped lithium watch battery having an anode 11 on a first planar side and a cathode 12 on an opposing second planar side. A circumferential edge 13 extends completely thereabout. It is also preferable the battery 10 have a mass of less than approximately 4 grams so as to not cause excessive drag on a fishing line 33, nor hinder casting a lure 34, nor cause turbulence as water flows over and about the body 9 as it moves through the water that might negatively affect action of a lure 34 attached to the fishing line 33.

Figure 10:
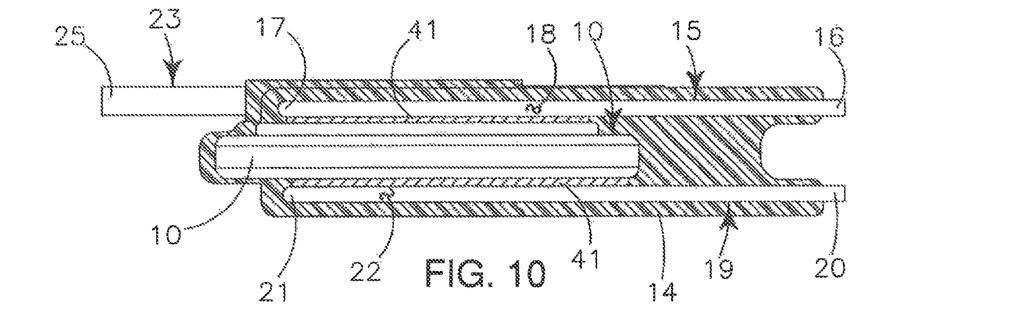
FIG. 10 is an orthographic cross section view of the Line Light of FIG. 3 showing the medial channels defined by the first and second tubes and the waterproof coating.
Figure 11:
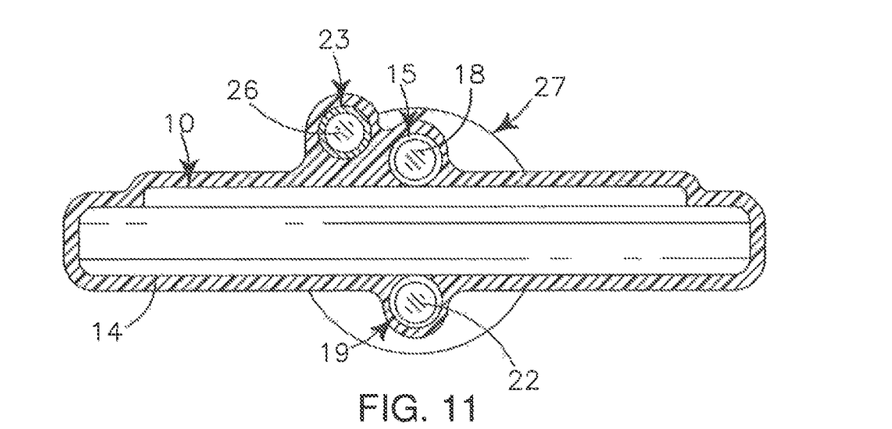
FIG. 11 is an orthographic cross section view of the Line Light of FIG. 8 showing the medial channels defined by the first and second tubes, the line tube and the waterproof coating.

In the preferred embodiment, the first tube 15 and the second tube 19 are formed of brass so as to be electrically conductive and non corrosive. It is expressly contemplated materials other than brass which are electrically conductive, and attachable to the battery 10 in an electrically conductive connection such as welding 41 may likewise be used. The first tube 15 has a first end portion 16, a spaced apart opposing second end portion 17 and defines a medial channel 18 extending therethrough between the first end portion 16 and the second end portion 17. (FIG. 10). Similarly, the second tube 19 has a first end portion 20, a spaced apart opposing second end portion 21 and defines a medial channel 22 extending therethrough between the first end portion 20 and the second end portion 21. (FIG. 10).

The first tube 15 is electrically structurally attached to the anode 11, and the second tube 19 is electrically structurally attached to the cathode 12 preferably by welding 41 although other attachment methods are likewise contemplated such as soldering, so long as the interconnection provides electrical conductivity therebetween. The direct structural electrically conductive attachment of the first tube 15 to the anode 11 makes the first tube 15 the equivalent of the anode 11. Similarly the direct structural electrically conductive attachment of the second tube 19 to the cathode 12 makes the second tube 19 the equivalent of the cathode 12. The medial channels 18, 22 defined by each tube 15, 19 respectively are parallel to one another and are spaced apart by thickness 40 of the battery 10 and thickness (not shown) of side walls of the tubes 15, 19. First end portions 16, 20 of the first tube 15 and second tube 19 respectively extend radially outwardly beyond the circumferential edge 13 of the battery 10. While the second end portions 17, 21 do not extend beyond the circumferential edge 13 of the battery 10. This alignment of the first end portions 16, 20 of the first tube 15 and the second tube 19 provides easy visual identification of the anode 11 and cathode 12.

Figure 12:
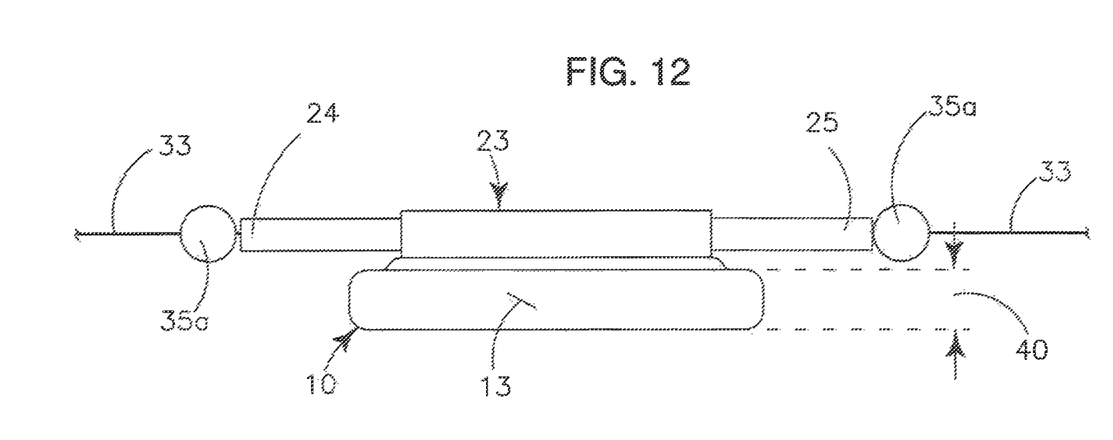
FIG. 12 is a orthographic partial second side view, similar to that of FIG. 5, less the first and second tubes, showing split shot lead weights attached to the fishing line adjacent the end portions of the line tube to positionally maintain the Line Light on the fishing line.

The line tube 23 is affixed to the battery 10 adjacent to and in parallel alignment with the first tube 15. The line tube 23 similarly has a first end portion 24, a spaced apart opposing second end portion 25 and defines a medial channel 26 extending therethrough from the first end portion 24 to the second end portion 25. First end portion 24 of the line tube 23 is not aligned with the first end portions 16, 20 of the first and second tubes 15, 19 respectively, but rather is positioned radially inwardly from the first end portions 16, 20 of the first and second tubes 15, 19 respectively. This offset position allows easy identification of the first and second tubes 15, 19 that are electrically conductive. The second end portion 25 of the line tube 23 is preferably positioned radially outwardly beyond the peripheral edge 13 of the battery 10 generally diametrically opposite the first end portions, 20 of the first tube 15 and second tube 19. This positioning of the line tube 23 makes it easier to positionally maintain the body 9 with a placement means 35 such as a split-shot sinker 35a. (FIG. 12).

The battery 10, first tube 15 and second tube 19 and at least a portion of the line tube 23 are coated in a flexible durable waterproof coating 14 such as, but not limited to, rubber, or latex or plastic. In the preferred embodiment, liquid tape material is used to provide the flexible durable waterproof coating 14.

Figures 1, 2:
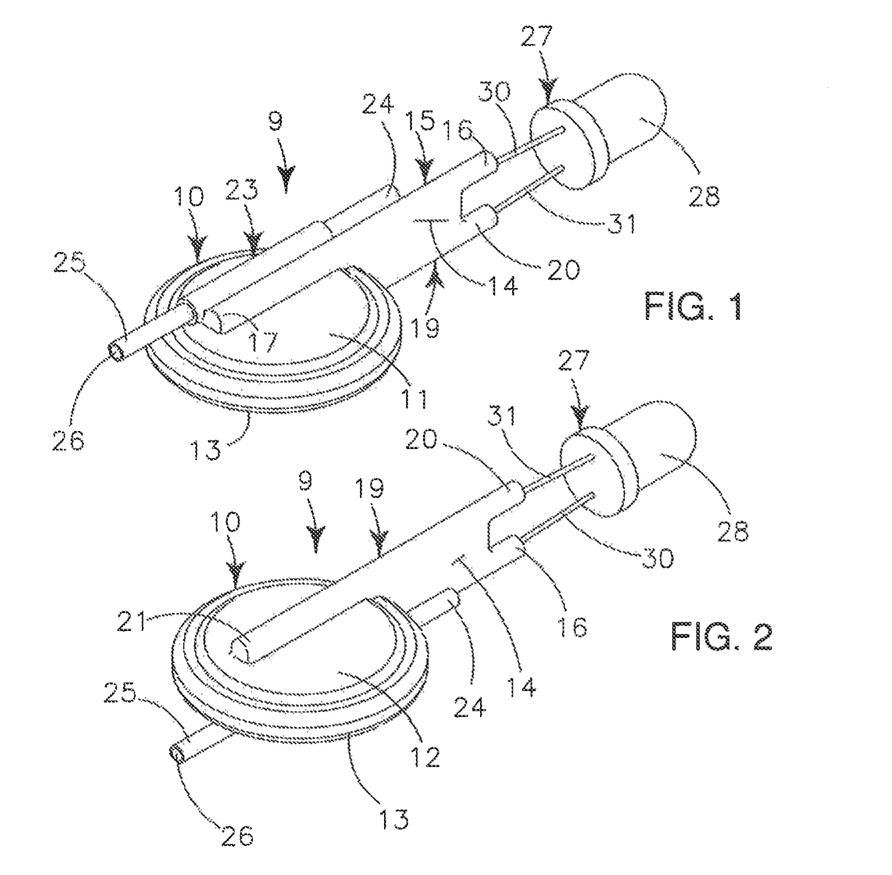
FIG. 1 is an isometric top, first side and second end view of my line light carrying an LED.
FIG. 2 is an isometric bottom, second side and second end view of my line light carrying and LED.
Figure 3:
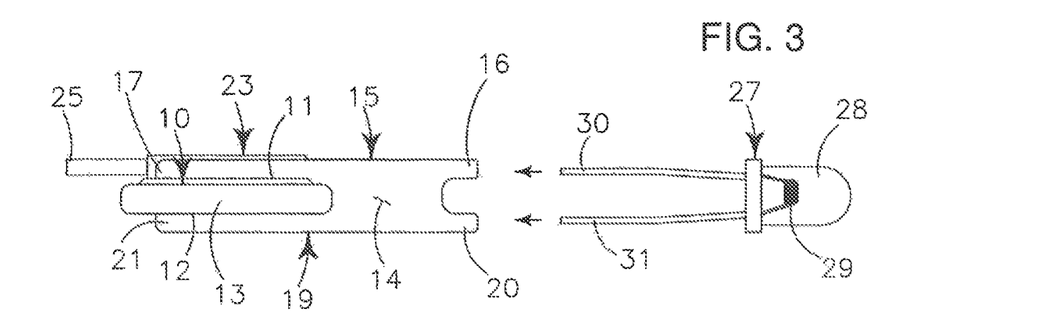
FIG. 3 is an orthographic first side view showing the line light with the LED removed from the first and second tubes but aligned therewith.
Figure 4:
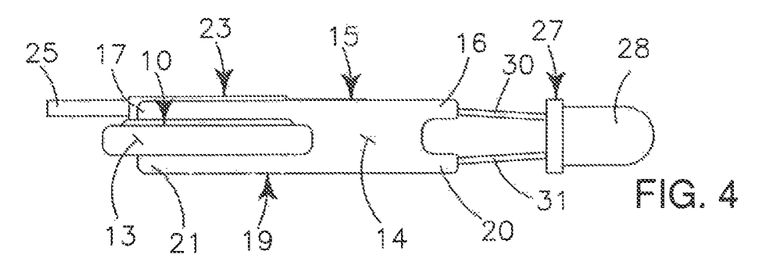
FIG. 4 is an orthographic first side view, similar to that of FIG. 3, showing the LED engaged in the first and second tubes.
Figure 5:
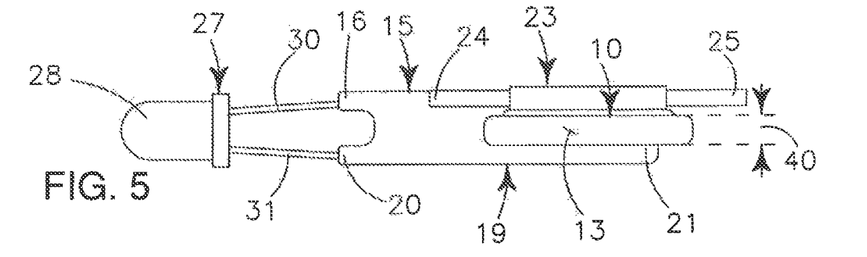
FIG. 5 is an orthographic second side view, similar to that of FIG. 4.
Figure 6:
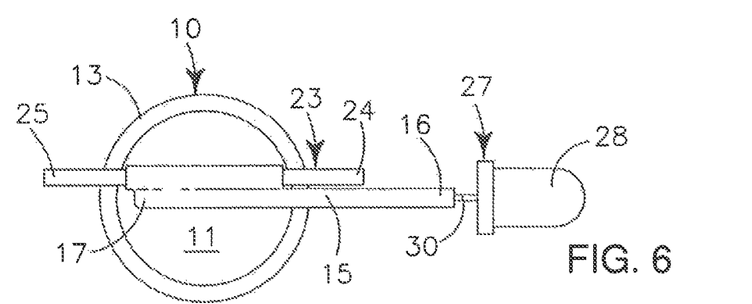
FIG. 6 is an orthographic top, downward looking view, of the Line Light of FIG. 4.
Figure 7:
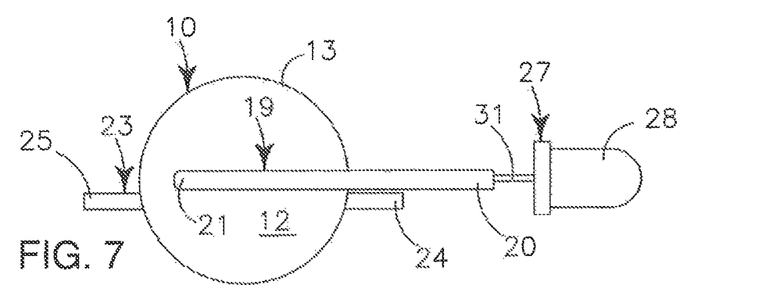
FIG. 7 is an orthographic bottom, upward looking view, of the Line Light of FIG. 4.
Figure 8:
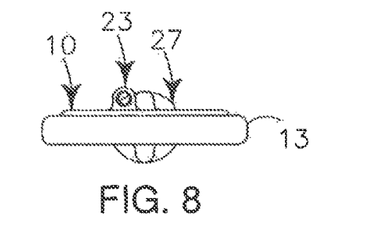
FIG. 8 is an orthographic second end view, of the Line Light of FIG. 4.
Figure 9:
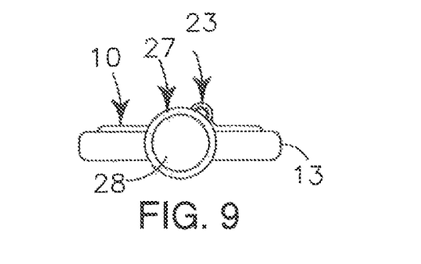
FIG. 9 is an orthographic first end view, of the Line Light of FIG. 4.

The LED 27 has a bulb 28 carrying an element 29 therein and first and second elongated electrical contacts 30, 31 which electrically communicate with the element 29. The LED 27 is interconnected with the battery 10 by inserting the first electrical contact 30 into the medial channel 18 defined by the first tube 15 and simultaneously inserting the second electrical contact 31 into the medial channel 22 defined by the second tube 19. (FIG. 3). Because the first tube 15 and second tube 19 are structurally and electrically connected to the anode 11 and the cathode 12, the first tube 15 and the second tube 19 are effectively the anode 11 and the cathode 12 respectively. The electrical contacts 30, 31, electrically communicate with element 29, so that when the electrical contacts 30, 31 are inserted into the medial channels 18, 22, a simple electrical circuit is completed providing electrical power to the element 29 causing the element 29 to become energized which responsively causes the bulb 28 to illuminate.

My line light has no switch nor switching means as that term is properly defined in dictionaries. The electrical contacts 30, 31 of the LED 27 are in direct physical and electrical contact with the anode 11 and the cathode 12 without any circuitry, complex or otherwise, therebetween. This simple circuit has no spaces, voids, air pockets or channels which may fill will with water when subjected to hydrostatic pressure which would cause short circuits and cause the line light to be inoperable or unusable. As a result my line light invention is usable, and operates, at depths that would cause known lighted fishing lures to be crushed or otherwise made inoperable by hydrostatic pressures.

The first and second electrical contacts 30, 31 of the LED 27 are positionally maintained in electrical contact with the first and second tubes 15, 19 respectively by friction.

Having described the structure of my line light its operation may be understood.

Figure 14:
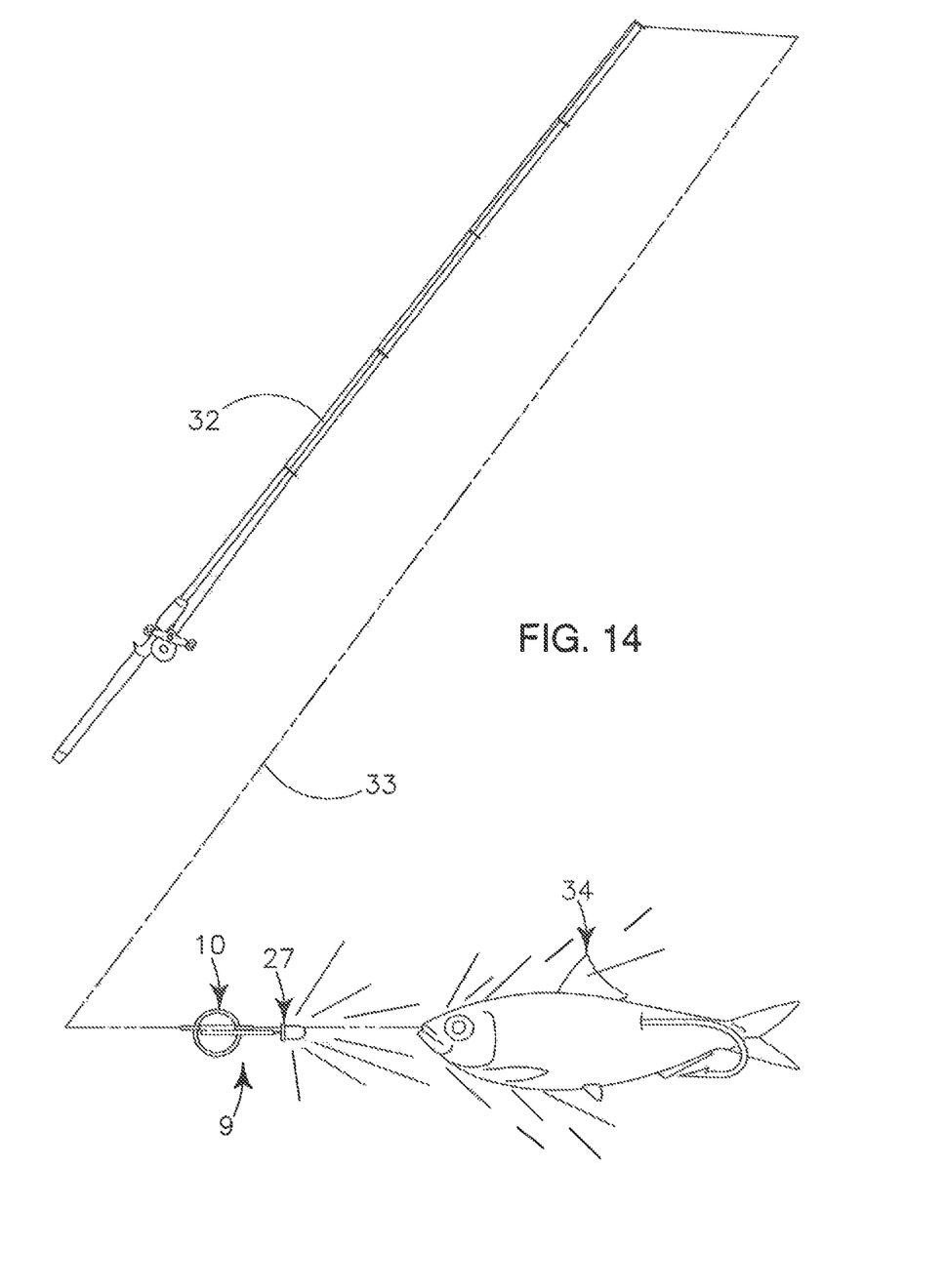
FIG. 14 is an illustration of a fishing pole with a fishing line carrying a Line Light proximately forward of a fish shaped lure, with light waves generated by the LED passing from the LED to the lure and striking and reflecting off the lure being drawn through the water.

The line light body 9 should be positioned on the fishing line 33 so that the LED 27 is proximate the fishing lure 34. (FIG. 14). An end (not shown) of a fishing line 33 is threaded through the medial channel 26 defined by the line tube 23 by inserting the fishing line 33 into the medial channel 26 from the second end portion 25 so that the fishing line 33 exits the medial channel 26 from the first end portion 24. Thereafter, a lure 34 may be attached to the end of the fishing, line 33 with a knot (not shown) or a swivel (not shown).

Figure 13:
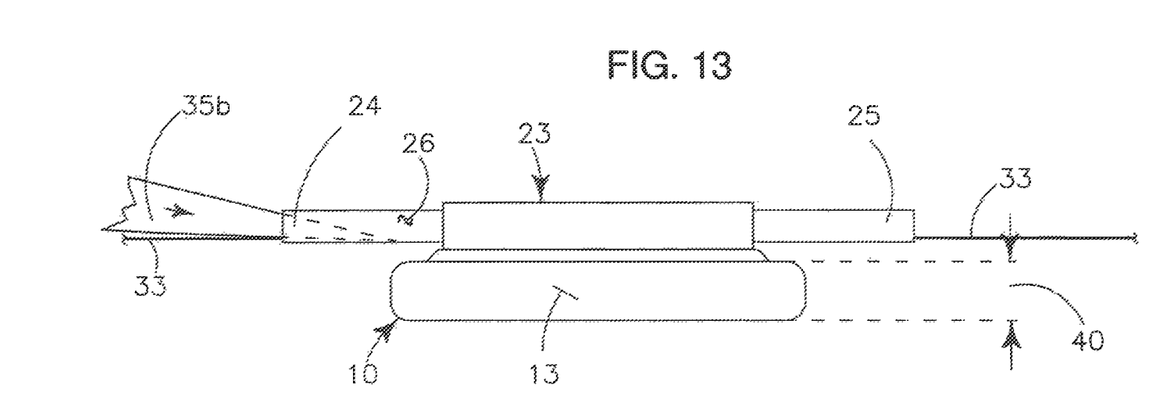
FIG. 13 is a orthographic partial second side view, similar to that of FIG. 12 showing an end portion of a tooth pick inserted into the medial channel of the line tube to positionally secure the Line Light on the fishing line.

The body 9 is positionally maintained on the fishing line 33 a distance from the lure 34 by attaching a placement means 35 which may be a split-shot lead weight 35a (FIG. 12) to the fishing line 33 adjacent the first end portion 24 and also adjacent the second end portion 25 of the line tube 23 to prevent the body 9 from moving along the fishing line 33. Positional maintenance of the body 9 on the fishing line 33 may also be established by inserting an object such as a portion of a "toothpick" 35b into the medial channel 26 of the line tube 23 adjacent the fishing line 33 to compress the fishing line 33 against an inner circumferential surface (not shown) of the line tube 23. (FIG. 13). Such compression increases friction between the fishing line 33 and the line tube 23 and prevents movement of the body 9 therealong.

An LED 27, of a color desired by the user (for example Red, Green, White, Yellow, Blue, Ultra Violet) is interconnected to the battery 10 by inserting the first electrical contact 30 into the first end portion 16 of the medial channel 16 defined by the first tube 15 attached to the anode 11 and simultaneously inserting the second electrical contact 31 into the first end portion 20 of the medial channel 22 defined by the second tube 19 attached to the cathode 12. Insertion of the LED 27 electrical contacts 30, 31 into the tubes 15, 19 completes a circuit and results in illumination of the bulb 28. Polarity of the LED 27 must be correct to cause illumination of the bulb 28 and the polarity may be altered by axially rotating the LED 27, 180° so that the first electrical contact 30 is inserted into the second tube 19 rather than the first tube 15 and the second electrical contact 31 is inserted into the first tube 15 rather than the second tube 19.

Once the LED 27 is interconnected with the battery 10 and is illuminated, fishing is commenced as desired. When the line light is in the water with the fishing line 33 and fishing lure 34, the illuminated bulb 28 casts light waves onto the spacedly adjacent fishing lure 34 (FIG. 14) increasing its reflectively and visibly to fish which responsively attracts fish and tends to cause them to bite and/or strike the lure 34 increasing the users yield of fish.

Because of the small mass, size and weight of my line light it can be used in nearly all types of fishing activities including still fishing, trolling, jigging as well as casting. Further my line light may be used in conjunction with other reflection enhancing apparatus such as "flashers" and/or "spinners" as well as with artificial baits and/or live baits.

The foregoing description of my invention is necessarily of a detailed nature so that a specific embodiment of a best mode may be set forth as is required, but it is to be understood that various modifications of details, sizes, and rearrangement, substitution and multiplication of the parts may be resorted to without departing from its spirit, essence or scope.

Having thusly described my invention, I file this Utility Patent Application and pray issuance of Utility Letters Patent.

What I claim is:

1. A line light for illuminating a separate and spaced apart fishing lure carried at a terminal end of a fishing line while in use underwater, the line light comprising:
    a body having:
        a first straight, electrically conductive tube;
        a second straight, electrically conductive tube;
        a disc-shaped battery; and
        a line tube;
        and wherein the body is releasably and adjustably carried on a fishing line proximate to, but spaced apart from, a separate fishing lure;

and wherein the disc-shaped battery has a generally planar anode on a first side of the disc-shaped battery and a generally planar cathode on an opposing second side of the disc-shaped battery;

and wherein the first straight, electrically conductive tube, defines a medial channel, is structurally secured directly to the anode by welding and without any intervening electrical components therebetween, the first straight, electrically conductive tube in electrical connectivity with the anode, and the second straight, electrically conductive tube, defining a medial channel, is structurally secured directly to the cathode by welding and without any intervening electrical components therebetween, the second straight, electrically conductive tube in electrical connectivity with the cathode, and wherein the first straight, electrically conductive tube and the second straight, electrically conductive tube are parallel to one another, and wherein the first straight, electrically conductive tube and the second straight, electrically conductive tube each has, an open first end and a closed, spaced apart, second end;

and wherein the line tube defines a medial channel extending entirely therethrough fixedly secured to one side of the disc-shaped battery and adjacent to and parallel to one of the straight, electrically conductive tubes, and having an open first end and an open second end;

a flexible waterproof coating extending entirely over and about the disc-shaped battery and the first and second straight, electrically conductive tubes and the line tube, the flexible waterproof coating not covering the open first ends of the first and second straight, electrically conductive tubes;

a light-emitting diode having a bulb carrying an element and two elongated spaced apart electric contacts electrically communicating with the element, and wherein the two elongated spaced apart electric contacts pass through the open first ends of the first and second straight, electrically conductive tubes, and releasably simultaneously engageable within the medial channels defined by the parallel first and second straight, electrically conductive tubes to complete an electric circuit without any intervening or intermediate circuitry or switch between the light-emitting diode and the anode and the cathode.

2. The line light of claim 1 and wherein the light-emitting diode emits ultra violet light waves.

3. The line light of claim 1 and wherein the line light has a weight of less than three (3) grams.

4. The line light of claim 1 and wherein the flexible water proof coating is rubber.

5. The line light of claim 1 and wherein the flexible water proof coating is latex.

6. The line light of claim 1 and wherein the flexible water proof coating is liquid tape material.

7. The line light of claim 1 and wherein the line light is adjustably secured to the fishing line proximate to the separate and spaced apart fishing lure with split shot lead weights secured to the fishing line adjacent an end portion of the line tube.

8. The line light of claim 7 and wherein the split shot weights comprise a first split shot weight and a second split shot weight, the first split shot weight secured to the fishing line adjacent the open first end of the line tube and the second split shot weight secured to the fishing line adjacent the open second end of the line tube.

9. The line light of claim 1 and wherein the light emitting diode emits light waves selected from a group consisting of red, yellow, green, white, and blue.

10. The line light of claim 1 and wherein the line light has no voids or air pockets.

11. The line light of claim 1 and wherein the disc-shaped battery weighs less than four (4) grams.

12. The line light of claim 1 and wherein the first straight, electrically conductive tube and the second straight, electrically conductive tube are composed of brass.

13. The line light of claim 1 and wherein the line light does not have any resistors, capacitors, switches, nor diodes, except for the light-emitting diode.

14. A line light for illuminating a separate and spaced apart fishing lure during use underwater, the line light comprising:
a body having:
a first straight, electrically conductive tube;
a second straight, electrically conductive tube;
a disc-shaped battery; and
a line tube;
and wherein the body releasably and adjustably carried on a fishing line proximate to, but spaced apart from, a separate fishing lure;

and wherein the disc-shaped battery has a generally planar anode on a first side of the disc-shaped battery and a generally planar cathode on an opposing second side of the disc-shaped battery;

and wherein the first straight, electrically conductive tube, defines a medial channel, is structurally secured directly to the anode by welding and without any intervening electrical components therebetween, the first straight, electrically conductive tube in electrical connectivity with the anode, and the second straight, electrically conductive tube, defining a medial channel, is structurally secured directly to the cathode by welding and without any intervening electrical components therebetween, the second straight, electrically conductive tube in electrical connectivity with the cathode, wherein the first straight, electrically conductive tube and the second straight, electrically conductive tube are parallel to one another, and wherein the first straight, electrically conductive tube and the second straight, electrically conductive tube each has, an open first end and a closed, spaced apart, second end;

and wherein the line tube defines a medial channel extending entirely therethrough fixedly secured to one side of the disc-shaped battery and adjacent to and parallel to the first straight, electrically conductive tube, and having an open first end and an open second end;

a flexible waterproof coating extending entirely over and about the disc-shaped battery and the first and second straight, electrically conductive tubes and the line tube, the flexible waterproof coating not covering the open first ends of the first and second straight, electrically conductive tubes;

a light-emitting diode having a bulb and two elongated spaced apart electric contacts electrically communicating with an element inside the bulb, and wherein the two elongated spaced apart electric contacts pass through the open first ends of the first and second straight, electrically conductive tubes, and releasably simultaneously engageable within the medial channels defined by the parallel first and second straight, electrically conductive tubes carried by the disc-shaped battery to complete an electric circuit and to cause the bulb to illuminate without intermediate or intervening circuitry or switches between the anode and the cathode and the light-emitting diode, and wherein the light-emitting diode emits ultra violet light waves;
and wherein the line light is positionally secured along a length of the fishing line by a split shot weight secured to the fishing line immediately adjacent an end of the line tube proximate the separate fishing lure carried at a terminal end of the fishing line.

* * * * *